United States Patent [19]

Bourdon et al.

[11] 4,157,806

[45] Jun. 12, 1979

[54] APPARATUS FOR MAKING ELECTRICAL CONNECTOR INSERT

[75] Inventors: Normand C. Bourdon; Richard Sanford, both of Sidney, N.Y.

[73] Assignee: The Bendix Corporation, Southfield, Mich.

[21] Appl. No.: 858,305

[22] Filed: Dec. 7, 1977

Related U.S. Application Data

[62] Division of Ser. No. 728,821, Oct. 1, 1976.

[51] Int. Cl.[2] .......... B29D 31/00

[52] U.S. Cl. .......... 249/184; 249/145; 425/577

[58] Field of Search .......... 425/577, 468; 249/63-64, 145, 184; 339/59 M

[56] References Cited

U.S. PATENT DOCUMENTS

| | | | |
|---|---|---|---|
| 445,284 | 1/1891 | Egge | 425/468 |
| 3,368,185 | 2/1968 | Dell et al. | 339/217 |
| 3,387,323 | 6/1968 | Wyllie et al. | 249/63 |
| 3,550,209 | 12/1970 | Carpenter | 425/577 |
| 4,025,269 | 5/1977 | Reinders | 425/577 |

*Primary Examiner*—John McQuade

*Attorney, Agent, or Firm*—Kenneth A. Seaman; Raymond J. Eifler

[57] ABSTRACT

An apparatus for molding a one piece insert (10) for retaining a plurality of electrical contacts (20) in an electrical connector. The insert (10) includes a plurality of bores or passageways (15) having integral with the insert means for retaining a contact within each of the insert passages. The integral means for retaining a contact (20) includes a plurality of radially deflectable contact retaining fingers (11) adjacent a plurality of ribs (16). Shoulders (17) on the ribs (16) and the free ends (12) of the retention fingers (11) engage forwardly and rearwardly facing shoulders (21, 22) on a contact, thereby captivating a portion (25) of the contact within the insert. The radially deflectable fingers (11) in the insert allow a contact to be inserted and removed from one end of an electrical connector. The apparatus for molding the insert includes two mold halves which when assembled together define a cavity in the shape of the desired insert, and a plurality of assemblies to form the passageways (15) with integral fingers (11) and ribs (16) with shoulders (17). The assemblies are in the form of interfitting dowel pin (50) and dowel bushing (60) which extend from the mold halves.

6 Claims, 21 Drawing Figures

APPARATUS FOR MAKING ELECTRICAL CONNECTOR INSERT

This is a division, of application Ser. No. 728,821, filed Oct. 1, 1976.

CROSS-REFERENCE TO RELATED APPLICATION

The subject matter of this patent application is related to patent application Ser. No. 728,820, now U.S. Pat. No. 4,082,398 entitled "Electrical Connector with Front and Rear Insertable and Removable Contacts" filed Oct. 1, 1976, the same date as the parent of this patent application.

BACKGROUND OF THE INVENTION

This invention relates to electrical connectors of the type having insertable and removable contacts. The invention is more particularly related to an apparatus for making the insert within an electrical connector and the contact retaining mechanism designed is an integral part of the insert.

Electrical connectors generally include a plug and receptacle, each of which has an insert of dielectric material provided with multiple openings within which electrical contacts are retained. The insert is introduced from the rearward end of the metallic shell where it is held in place by some means, such as a nut. Some connectors provide for rear insertion and front or rear release of electrical contacts while others provide for front insertion and front or rear release of electrical contacts. These features are desirable and facilitate the assembly and servicing of the connector. Examples of a prior art electrical connector having insertable and removable contacts may be found in U.S. Pat. No. 3,165,369 entitled "Retention System for Electrical Contacts" and issued Jan. 12, 1966 to J. W. Maston; and U.S. Pat. No. 3,221,292 entitled "Electrical Connector" and issued Nov. 30, 1965 to G. J. Swanson et al.

For many years connector manufacturers have been improving and developing means to retain electrical contacts in the electrical connector so that they may be easily inserted and removed with little or no dislocation of contact upon insertion, removal and mating. However, such development has led to complex and intricate retaining mechanisms which were generally comprised of at least two or more pieces. When more than one piece is used, it is necessary to seal the pieces together to eliminate lower resistance paths between contacts that are found between the contacts separated by the dielectric material of the insert. The complexity of prior art contact retention mechanisms is exemplified by the electrical connector and insert shown in U.S. Pat. No. 3,727,172 entitled "Electrical Connector" and issued to Kenneth M. Clark on Apr. 10, 1973; and U.S. Pat. No. 3,638,165 entitled "Electrical Connector Contact Retention Assembly" issued Jan. 25, 1972 to J. W. Anhalt et al.

A present problem with electrical connectors of the type that use multiple pieces to form their contact returning insert is the occurrence of electrical breakdowns between contacts along the interface of the pieces that form the contact retaining insert. Also, the additional steps required in the manufacture and assembly of an electrical connector having multiple piece contact retaining inserts increase the cost of the connector.

SUMMARY OF THE INVENTION

This invention provides a core pin (50) and a bushing (60) assembly for making a one piece electrical connector insert (10) that includes integral therewith a contact retention mechanism (11, 16) that allows electrical contacts (20) to be inserted and removed from the insert. The one piece insert eliminates the problem of low electrical resistance (leakage) paths between electrical contacts formerly occurring along the interface of the pieces of a multiple piece insert and is less costly to manufacture than multiple piece contacts.

The invention is novel assembly enables the manufacture of an electrical connector characterized by a one piece insert (10) having a plurality of passages (15) therethrough, each passage including a plurality of ribs (16) integral with the insert and a truncated tubular contact retention cone or fingers (11) integral with the insert. The contact retention cone and ribs are arranged to captivate the enlarged portion (25) of an electrical contact (20). The contact retaining fingers or cone (11) is resiliently radially expandable or deflectable to permit the enlarged portion of a contact to be inserted into the insert. The cone or fingers contract behind the enlarged portion of the contact (20) to limit movement of the contact in one direction while shoulders (17) at the end portion of the ribs (16) engage the other side of the enlarged portion (25) of the contact to limit movement of the contact in the opposite direction.

Such, an electrical connector provides for rear insertable and removable electrical contacts of the type having an enlarged section defining two shoulders and is comprised of the following elements: a body (10) of molded dielectric material having a plurality of passages (15) therethrough from a front face (18) to a rear face (19), each passage adapted to receive a respective electrical contact (20) therein which is insertable from the rear face (19) of the insert (10), each passage (15) including a plurality of ribs (16) integral with said body in said passage wall, each of said ribs terminating in a rearwardly facing shoulder adapted to engage one of said contact shoulders (21, 22) when said contact (20) is inserted into said insert (10) from the rear face (19); and a truncated tubular contact retention cone (11) integral with said body (10) and located coaxially within said passage, the cone (11) tapering forwardly and radially inwardly from the wall of the passage to a forward free end (12) which terminates a predetermined distance from the rib shoulders (17), said free end (12) adapted to engage the other of the contact shoulders (21, 22) when the contact (20) is inserted into the insert from the rear face, the cone (11) being resiliently radially expandable to permit the enlarged section (25) of a contact (20) to pass therethrough upon insertion of the contact (20) into the passage (15), the cone (11) contracting behind the other of said contact shoulders (21, 22) to limit rearward movement of the contact in the passage, the cone (11) being substantially rigid in an axial direction when in its contracted position so as to provide a positive stop against rearward movement of an electrical contact, whereby the enlarged portion of a contact inserted into the passage is captivated between the free end (12) of the retention cone and the shoulders (17) of the ribs. The core pin (50) and the bushing (60) are adapted to interfit for molding to form the connector insert (10) described above. In one embodiment of the present invention, the core pin (50) includes a body with a plurality of radially-extending fins (54) with recessed portions between the adjacent fins. The bushing (60) includes an axially extending bore (62) and a plurality of axial slots (64) communicating with the bore. The core pin (50) includes an axial projection (52) which fits into the bore when the pin and bushing are assembled. The assembled core pin and bushing define the ribs and shoulders of the insert and the passage for receiving the contact therein.

Accordingly, it is an object of this invention to provide an apparatus for making a one piece dielectric insert for retaining a plurality of electrical contacts in an electrical connector.

The above and other objects and features of the invention will become apparent from the following detailed description taken in conjunction with the accompanying drawings and claims which form a part of this specification. Further, the use of numerals is for the purpose of clarification only and is not intended to limit the structure to the specific structure illustrated.

DETAILED DESCRIPTION OF THE DRAWINGS

Figure 1:
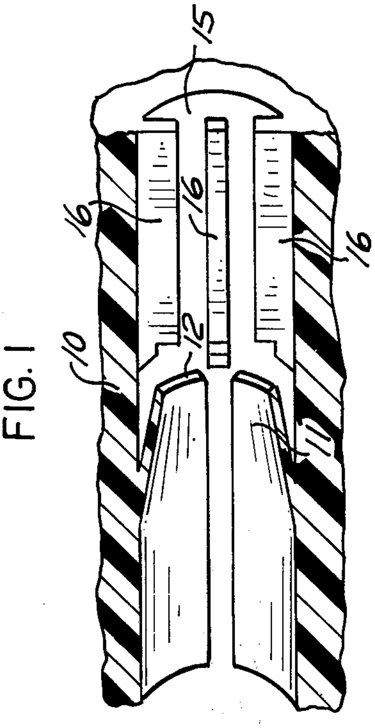
FIG. 1 is a partial cross-sectional diagrammatic view of the contact retention mechanism of an electrical connector insert which may be made using the apparatus of this invention.

Referring now to the drawings, FIG. 1 illustrates a portion of an electrical connector insert that may be made by the apparatus of the present invention. The insert 10 includes a plurality of passages 15, each having therein a truncated tubular contact retention cone 11 integral with the insert and a plurality of axially extending ribs 16 also integral with the insert. In prior art contact retention mechanisms, the truncated contact retention cone 11 is not an integral part of the insert. Details of the function and shape of a contact retention cone may be found in U.S. Pat. No. 3,165,369, hereby specifically incorporated by reference. The truncated contact retention cone 11 is located coaxially within each passage 15 and tapers forwardly and radially inwardly from the wall of the passage 15 to a forward free end which terminates a predetermined distance from a rearwardly facing shoulder 17 on each of the ribs 16. The cone 11 is resiliently radially expandable. Alternately, instead of the specific truncated tubular retention cone shape shown, a plurality of resiliently radially deflectable contact retention fingers may be used. Details of such contact retention fingers and how they operate to retain a contact may be found in U.S. Pat. No. 3,727,172, hereby specifically incorporated by reference.

Figure 2:
FIG. 2 is another partial cross-sectional view of an electrical connector insert made using the principles of this invention.

FIG. 2 is another cross-sectional view of a dielectric insert 10 that includes a plurality of ribs 16 and a truncated tubular contact retention cone 11 both integral with the insert 10. The free end 12 of the cone 11 faces the shoulder 17 at each end of the ribs 16 to define a space A, the function of which is to captivate the enlarged portion of an electrical contact (not shown).

Figure 3:
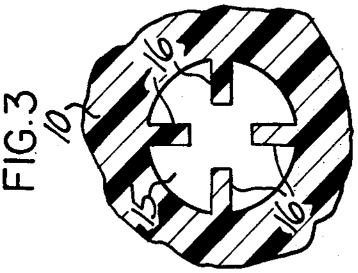
FIG. 3 illustrates a cross-sectional diagrammatic view looking in one end of the connector insert.

FIG. 3 illustrates diagrammatically an end view of the ribs 16 shown in FIG. 2. In this embodiment there are four ribs 16 which extend radially inwardly toward the axis of the bore 15 in the insert 10.

Figure 4:
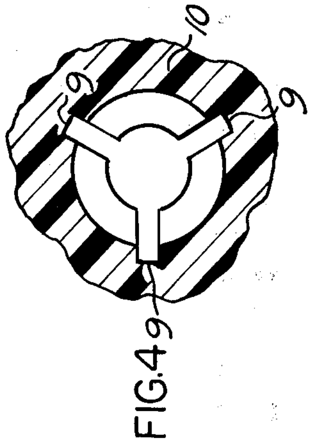
FIG. 4 is a cross-sectional diagrammatic view looking in the other end of the electrical connector insert.

FIG. 4 illustrates diagrammatically a cross-sectional view of the retention cone 11 shown in FIG. 2. In this embodiment the fingers that retain a contact (not shown) are in the shape of a tubular truncated contact retention cone 11 which is integral with the insert 10. Also included are a plurality of grooves 9 formed along the passage wall 15 during the molding process.

Figure 5:
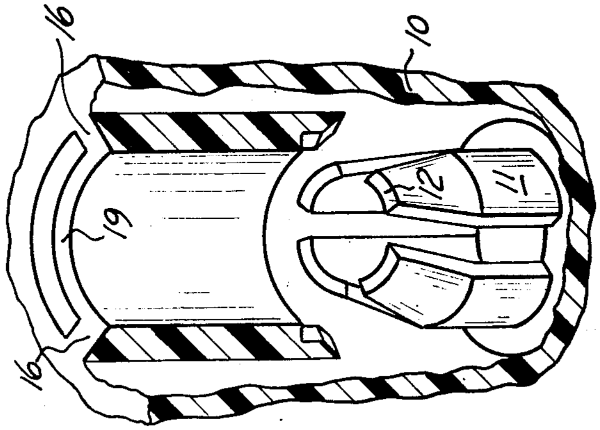
FIG. 5 illustrates an alternate embodiment of a portion of the insert.

FIG. 5 illustrates an alternate embodiment of the insert. In this embodiment of the invention, each of the ribs 16 are connected together by the addition of a radial and axially extending wall 19 of material. This arrangement adds increased axial strength within the insert 10 for retaining a contact (not shown) and preventing axial movement of the contact in the direction of the ribs 16.

Figure 6:
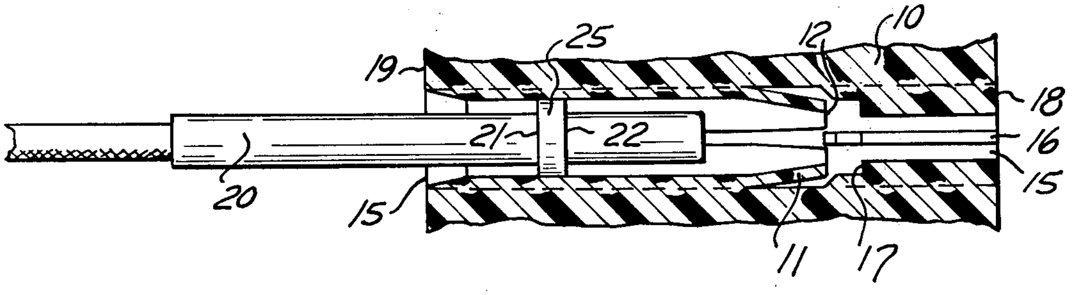
FIGS. 6, 7 and 8 illustrate how an electrical contact is inserted into the novel electrical connector insert.
Figure 7:
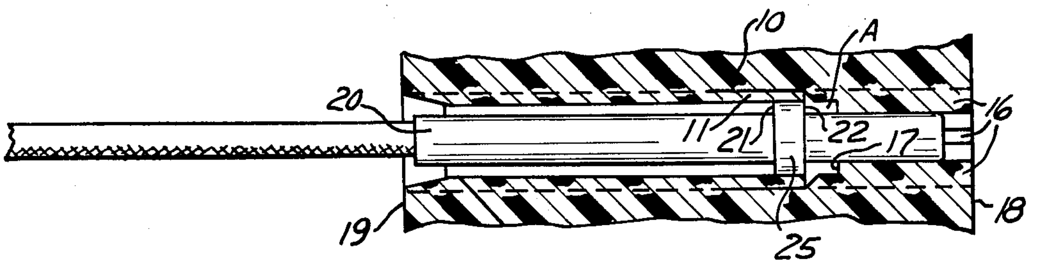
Figure 8:
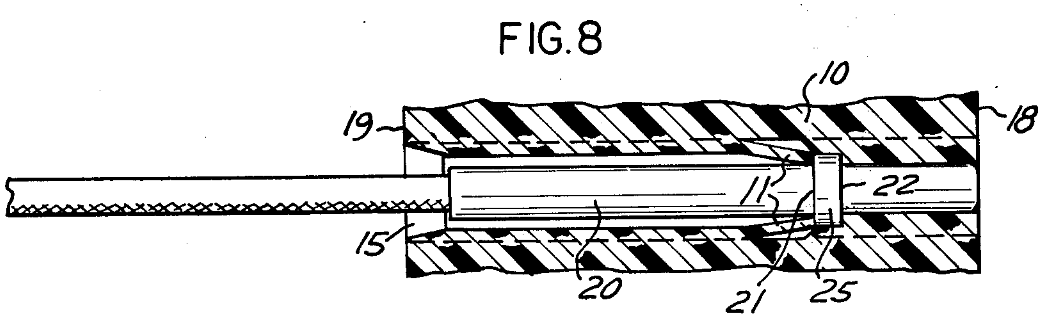

Referring now to FIGS. 6, 7 and 8 an electrical contact 20 is insertable into the insert 10 as follows: The insert generally includes a front face 18, a rear face 19 and a plurality of passages 15 extending therethrough. The electrical contact 20 is inserted into the passage 15 from the rear face 19. As the contact proceeds toward the front face 18, the enlarged portion 25 deflects or expands the retention cone 11 radially outwardly as shown in FIG. 7. This allows the enlarged portion 25 of the contact to proceed into space A. After the enlarged portion 25 of the contact 20 passes the free ends 12 of the contact retention cone 11, the cone contracts behind the rearwardly facing contact shoulder 21 to prevent rearward movement of the contact in the passage 15. Simultaneously, the rearwardly facing shoulders 17, on each of the ribs 16, engage the forwardly facing shoulder 22 to prevent further forward movement of the contact 20 within the passage 15. To remove the contact 20 from the passage 15 a suitable tool (not shown) is inserted into the passage 15 to deflect the contact retaining fingers 11 outwardly so that the enlarged portion 25 of the contact may be withdrawn from the passage 15.

Figure 9:
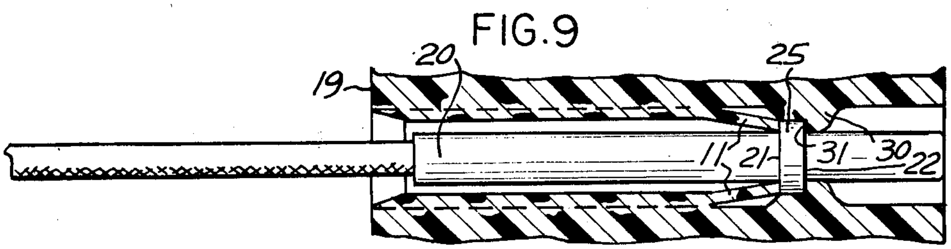
FIG. 9 illustrates another alternate embodiment of a portion of the insert.

FIG. 9 illustrates an alternate embodiment of the insert wherein the one piece insert 10 includes a plurality of resiliently and radially deflectable retention fingers 11 and a ring 30 having an annular shoulder 31 integral with the insert 10. The annular shoulder 31 is rearwardly facing and engages the forwardly facing shoulder 22 of the contact 20. The rearwardly facing shoulder 31 may be comprised of a single ring that extends 360° around the inside of the passage 15 or a plurality of annular segments (e.g. extending about 30 degrees), each having rearwardly facing shoulder 31.

Figure 10:
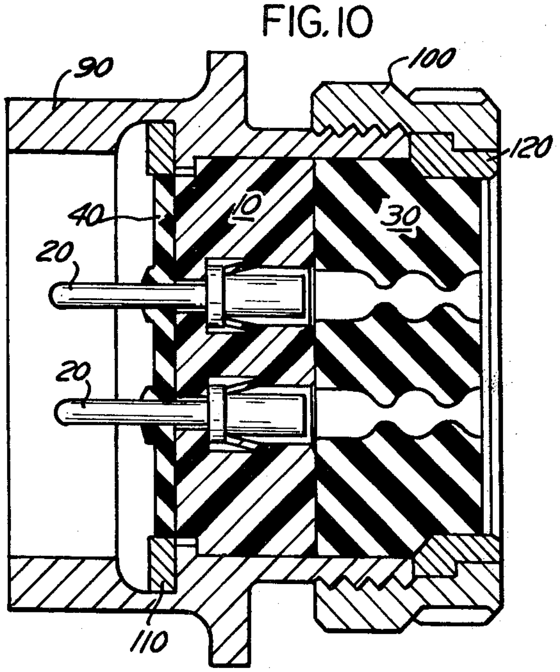
FIG. 10 illustrates an electrical connector assembly incorporating the contact retention insert.

FIG. 10 is one-half of an electrical connector assembly which incorporates the novel dielectric contact retention insert 10. This figure illustrates the simplicity of the connector assembly. In this embodiment the one-half of the connector assembly includes: the novel contact insert retaining insert 10; a plurality of contacts 20 retained by the insert 10; a rear moisture sealing grommet 30; an interfacial seal member 40; a sealing gasket 110; a connector shell 90; a retaining nut 100; and a retaining ring 120. Not shown is the other half of the connector assembly which is substantially identical to this half of the connector assembly except for the fact that the connector shell of the other half is mateable with this connector shell 90 and the contacts instead of being pin type contacts, are socket type contact mateable with pin type contacts.

FIGS. 11 through 14 illustrate a core pin and a core bushing utilized in the molding process to make the preferred embodiment of the contact retaining insert. Generally, the dielectric retention insert is made from a thermoplastic resin although other materials such as thermosetting materials may be used. For example, polyesters (valox), polyamides, such as nylon, fluoroethylene, acetates, such as delrin or a polycarbonate (lexan). Such materials have excellent electrical insulation characteristics and serve to increase the dielectric separation between adjacent contacts. The preferred materials are polyesters, polyarylsulfanes and polyethersulfane.

Figure 11:
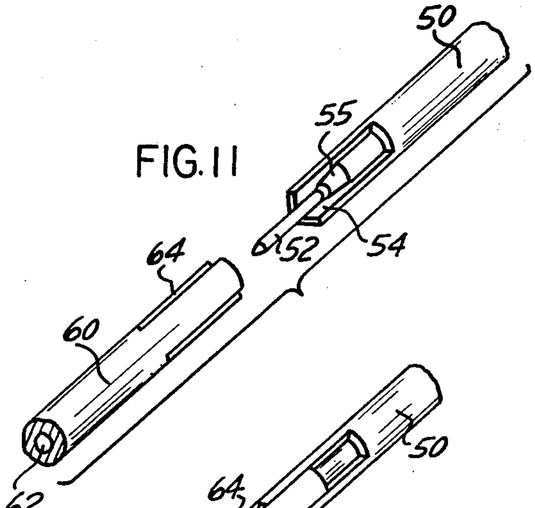
FIG. 11 illustrates a core pin and core bushing utilized in molding the contact retention insert.

FIG. 11 illustrates a core pin 50 and a core bushing 60 mateable therewith. The core pin 50 includes an axial projection 52; a plurality (three) of fins 54 and a portion 55 which is shaped to obtain a desired passageway configuration within the molded insert. The core bushing 60 includes an axially extending bore 62, a plurality (three) of slots 64 and a portion 65 shaped to obtain a desired outside configuration of the retention cones in the molded insert. The axial bore 62 is mateable with the projection 52 on the core pin and the slots 64 are mateable with the fins 54 on the core pin 50.

Figure 12:
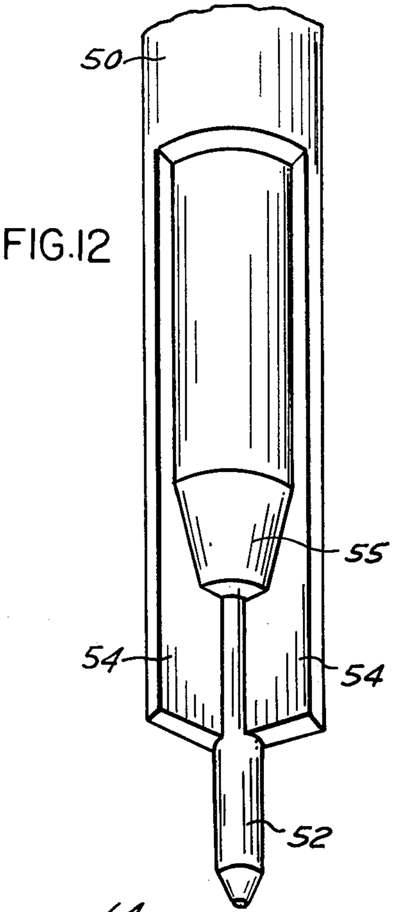
FIG. 12 is an enlarged view of the core pin used in molding the contact retention insert.

FIG. 12 illustrates an enlarged view of the core pin 50.

Figure 13:
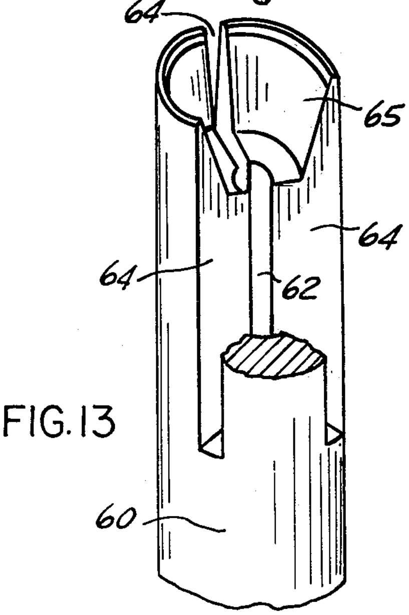
FIG. 13 is an enlarged view of the core bushing utilized in molding the contact retention insert.

FIG. 13 illustrates an enlarged and cutaway view of the core bushing 60 that mates with the core pin 50.

Figure 14:
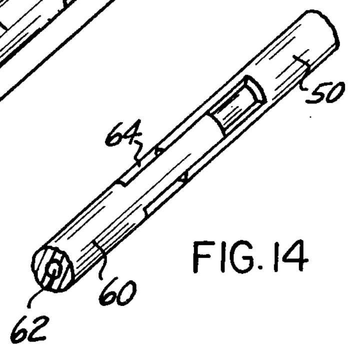
FIG. 14 illustrates the core pin and core bushing in mated relationship.

FIG. 14 illustrates the core pin 50 and core bushing 60 in mated relationship which, when in a mold will form the retention cone and ribs as an integral part of the connector insert.

FIGS. 15 through 19 illustrate how one embodiment of the dielectric contact retaining insert 10 is molded.

Figure 15:
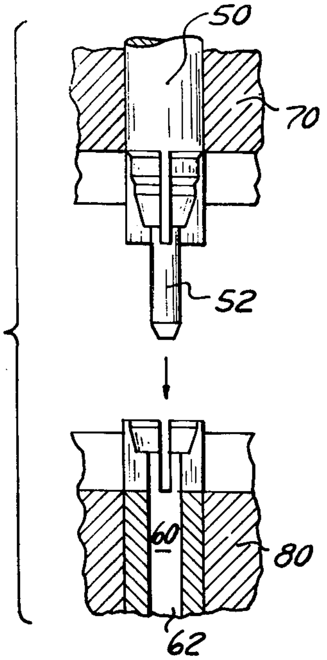
FIGS. 15 through 19 illustrate how the contact retention insert is molded.

FIG. 15 illustrates a portion one-half of the mold 70 having a plurality of core pins 50 mounted therein and a portion of the other half of the mold 80 having a plurality of core bushings mounted therein.

Figure 16:
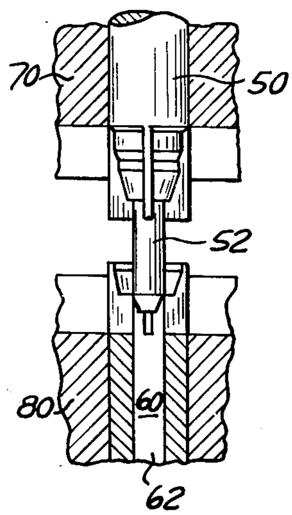

FIG. 16 illustrates how the axial projection 52 of a core pin 50 mates with the passageway 62 of a core bushing 60.

Figure 17:
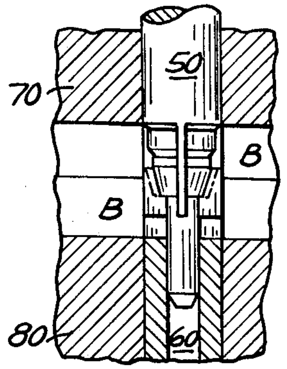

FIG. 17 illustrates a core pin 50 and a core bushing 60 in the fully mated position as well as the two halves 70 and 80 of the mold joined together to form a molding cavity B into which thermoplastic material in liquid form is poured and allowed to harden. The mold cavity B includes a plurality of mated core pins and bushings to form a molded contact retaining insert capable of retaining a plurality of electrical contacts (not shown). The mold, of course, has the appropriate means such as passageways through the upper one-half of the mold 70 into the cavity B for filling the cavity B with a thermoplastic material.

Figure 18:
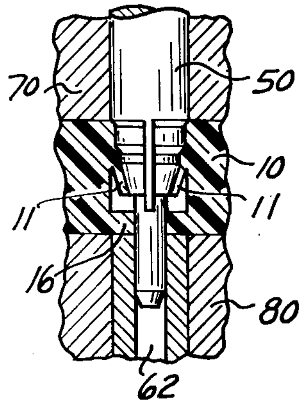
Figure 19:
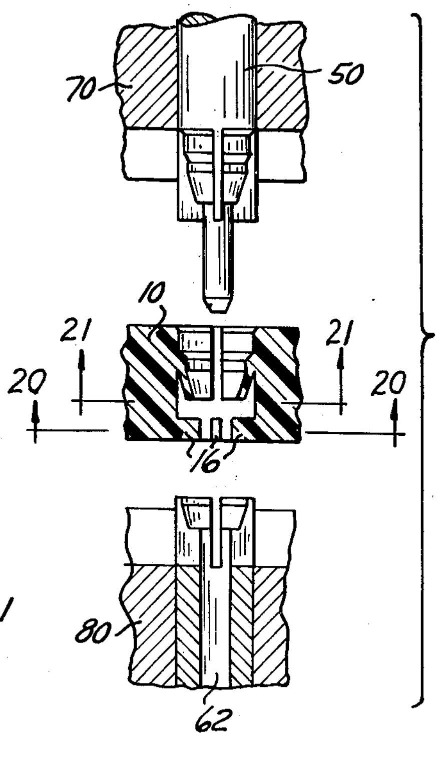
Figure 20:
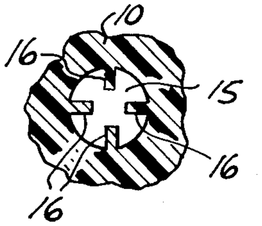
FIGS. 20 and 21 show diagrammatically portions of the molded contact retention insert.
Figure 21:
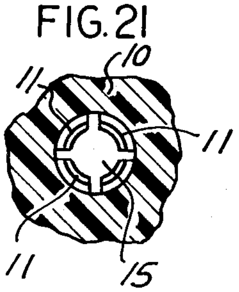

FIG. 18 illustrates the completely molded contact retention insert 10 which includes integral therewith the contact retaining fingers or towers 11 and the ribs 16. The portion of passage 15 in the cone portion of the insert 10 takes on the configuration of the core pin 50. FIGS. 19–21 illustrate the insert and core pin and bushing of an alternate configuration having four fins on the pin and four slots on the bushing to create a four rib and four shoulder contact retention system on the molded insert.

FIG. 19 illustrates the two halves 70 and 80 of the mold separated and the insert 10 which was formed in the mold cavity.

FIG. 20 illustrates a view of the ribs 16 looking along lines 20—20 of the insert 10 shown in FIG. 19. This view illustrates that in this embodiment there are four radial ribs 16 extending radially inwardly in passageway 15.

FIG. 21 illustrates a cross-sectional view looking along lines 21—21 of the insert 10 shown in FIG. 19. This view illustrates that the retention cone 11 is comprised of four portions extending radially inwardly in passage 15.

While a preferred embodiment of the invention has been disclosed, it will be apparent to those skilled in the art that changes may be made to the invention as set forth in the appended claims and, in some instances, certain features of the invention may be used to advantage without corresponding use of other features. For example, it was pointed out that the ribs 16 could be replaced by an annular shoulder 31 located in the passage 15 of the insert 10. Additionally, the position of the contact retention cone and ribs may be reversed depending on whether or not forward or rearward insertable contact electrical connector is desired. By arranging the insert 10 in an electrical connector with the free end of the truncated contact retention cone facing toward the front of the connector or the rear of the connector, the connector would receive electrical contacts from the rear or front, respectively. It is to be understood that, like the prior art fingers, the cone or fingers 11, although radially deflectable, are generally rigid in an axial direction when in their contracted position so as to provide a positive stop against rearward movement of an electrical contact. Accordingly, it is intended that the illustrative and descriptive materials herein be used to illustrate the principles of the invention and not to limit the scope thereof.

Having described the invention, what is claimed is:

1. An assembly adapted for use in making a molded electrical connector insert having a passageway with an integral retention cone and shoulders within the passageway, said assembly comprising:

a core pin and a core bushing; said core pin including a body, an axial projection extending from the body, a plurality of radially-extending fins mounted to the body, the axial projection extending beyond the ends of the fins, and a recessed portion between the fins, said recessed portion shaped to define the shape of the cone when molded; and said core bushing including a housing having an axially-extending bore and a plurality of slots extending axially along part of the length of the bare and communicating with the bore, said bore being adapted to receive the axial projection on said core pin and said slots being of shape and location for defining the shape of the shoulders on the insert when molded; and a portion at one end of the housing shaped to obtain a desired configuration of the cone in the molded insert.

2. An assembly of the type described in claim 1 wherein the fins on the core pin engage at least a portion of the slots of the core bushing when said core pin and core bushing are assembled.

3. An assembly adapted for use in making a molded electrical connector insert having a passageway with integral fingers and shoulders within the passageway, said assembly comprising:

a first member including:
 a body;
 a central axial projection extending from the body;
 a plurality of radially-extending fins mounted to the body, the axial projection extending beyond the ends of the fins; and
 a recessed portion between the fins, said recessed portion shaped to define at least a portion of the shape of the fingers when molded; and
a second member including:
 a housing having an axially-extending central bore and a plurality of slots extending axially along part of the length of the bare and communicating with the bore, said bore being adapted to receive the central axial projection of said first member in an assembled relationship and said slots being of shape and location for defining the shape of the shoulders on the insert when molded.

4. An assembly of the type described in claim 3 wherein the fins on the first member engage at least a portion of the slots of the second member when said first member and second member are assembled.

5. An assembly of the type described in claim 4 wherein a portion of the body of the first member and a portion of second member from the integral fingers when said first and second members are in the assembled relationships.

6. An assembly adapted for use in making a one-piece molded electrical connector insert having a passageway with retention fingers and ribs located within the passageway and integral with the insert when molded, said assembly comprising:

a first member including:
 a body;
 a central axial projection extending forwardly from the body;
 a plurality of radial extending fins mounted to the body, the axial projection extending beyond the ends of the fins; and
 a recessed portion between the fins, said recessed portion tapering inwardly and forwardly; and
a second member adapted to mate with said first member, said second member including:
 a housing having a forward end which includes:
  an inwardly and rearwardly extending tapered portion adapted to receive, in spaced relationship, the tapered portion of said first member and define a cavity therebetween;
  an axially extending central bore adapted to receive the axial projection of said first member; and
  a plurality of slots extending from the forward end along part of the length of the bore and communicating with the bore and adapted to receive a portion of the fins of said first member, whereby, when said first and second members are mated together, the axial projection is in the central bore, a portion of each fin is in a portion of a respective slot and the tapered portion of said first and second members are located alongside each other in spaced relationship to form the cavity, so that when an insert molding material is applied around and into said mated members, the first and second members form a passageway in the insert, the axial slots and respective fins form ribs located within the passageway and the cavity between the tapered portions form retention fingers in the passageway.

* * * * *